April 27, 1954 R. M. PAGE 2,677,127

RADIO ECHO INDICATING APPARATUS

Filed Aug. 21, 1942 7 Sheets-Sheet 1

Inventor
Robert M. Page

By [signature]

Attorney

April 27, 1954 R. M. PAGE 2,677,127

RADIO ECHO INDICATING APPARATUS

Filed Aug. 21, 1942 7 Sheets-Sheet 2

Inventor
By Robert M. Page
Attorney

April 27, 1954 R. M. PAGE 2,677,127

RADIO ECHO INDICATING APPARATUS

Filed Aug. 21, 1942 7 Sheets-Sheet 3

Inventor
ROBERT M. PAGE

By Q. Baxter Warner
Attorney

Inventor
Robert M. Page

By [signature]

Attorney

April 27, 1954 R. M. PAGE 2,677,127

RADIO ECHO INDICATING APPARATUS

Filed Aug. 21, 1942 7 Sheets-Sheet 5

Inventor

Robert M. Page

By [signature]

Attorney

April 27, 1954 R. M. PAGE 2,677,127

RADIO ECHO INDICATING APPARATUS

Filed Aug. 21, 1942 7 Sheets-Sheet 6

Inventor
Robert M. Page
By [signature]
Attorney

RADIO ECHO INDICATING APPARATUS

Filed Aug. 21, 1942

7 Sheets-Sheet 7

Inventor
Robert M. Page
By [signature]
Attorney

Patented Apr. 27, 1954 2,677,127

UNITED STATES PATENT OFFICE 2,677,127

RADIO ECHO INDICATING APPARATUS

Robert M. Page, Washington, D. C.

Application August 21, 1942, Serial No. 455,582

11 Claims. (Cl. 343—11)

(Granted under Title 35, U. S. Code (1952), sec. 266)

This invention relates to radio echo apparatus and more particulary to systems for detecting the presence of remote objects included within a field extending 360° about a reference point and for producing a visual plan position indication of such area whereon indications of detected remote objects are produced in such a manner as to simultaneously show range and direction thereof.

Radio echo apparatus disclosed by the prior art include a directional beam antenna from which equally spaced energy pulses are emitted at a constant rate, and an indicator, such as a cathode ray oscillograph, upon which a time sweep is impressed in synchronism with the energy pulses emitted from the antenna. When the emitted energy pulses impinge upon remote objects, echo pulses are reflected from the objects and applied to the indicator in such a manner as to produce an indication on the sweep which portrays a measurement of range of the object from which the echo pulse is reflected. In the prior systems directional indications of remote objects detected in the foregoing manner are derived from the angular position of the directional beam antenna. Directional indications obtained in this manner are not of a high degree of accuracy since the directional beam necessarily has a substantial width, approximately equal to an arc of 10° to 15°, and therefore echo pulse indications are produced on the indicator whenever a remote object is included within any portion of the beam. Consequently, it becomes necessary to continually adjust the antenna bearing until echo pulse indications of maximum amplitude are produced, in which case it is assumed that the center of the beam, the portion thereof having maximum power, is directed toward the object, and that the antenna is likewise pointing directly toward the object. The foregoing operations are difficult to rapidly perform with a high degree of accuracy and therefore the prior systems are only capable of producing approximate indications of direction of remote objects.

From the foregoing it can be readily seen that numerous difficulties arise when attempting to determine range and direction of a remote object with a radio echo system of conventional construction. As mentioned heretofore, directional indications, when obtained, are not of a high degree of accuracy, and furthermore, it is extremely difficult to obtain a directional indication of a remote object which corresponds to a remote object indication on the indicator since the means for obtaining range and bearing are distinct devices completely isolated from each other. The foregoing defects are more readily comprehended when attempting to determine range and direction of all remote objects included within an area extending 360° about the apparatus. It is necessary, in the latter instance, to slowly rotate the antenna by small increments throughout 360° and to continually record echo pulse indications appearing on the indicator for each position of the antenna. In view of the fact that extremely tedious operations are required to obtain substantially accurate bearing indications, the fallacies of the foregoing method are obvious, and the same becomes impossible in instances wherein the remote objects are moving at high velocities, such as aircraft, for example.

It is therefore an object of the present invention to provide a novel method for indicating range and direction of remote objects.

Another object is to provide a novel method for simultaneously indicating range and direction of remote objects.

Another object is to provide novel means for indicating range and direction of remote objects.

Another object is to provide novel means for simultaneously indicating range and direction of remote objects.

Another object is to provide novel means for simultaneously indicating a plurality of values on an oscillograph by use of polar coordinates.

Another object is to provide novel means for simultaneously indicating range and direction of remote objects on an oscillograph by use of separate coordinates.

Another object is to provide novel means for continually indicating range and azimuth of remote objects included within a field extending 360° about the apparatus, with the indication of each object simultaneously showing range and direction thereof.

Still another object of the present invention is to provide a novel method for producing a rotating radial sweep of the electron beam of an oscillograph.

Still another object is to provide a novel sweep circuit for producing a rotatable radial sweep of the electron beam of an oscillograph.

Still another object is to provide a system for indicating direction of remote objects which includes a novel sweep circuit for producing a rotatable radial sweep of the electron beam of an oscillograph, the angular position of which is an indication of direction of remote objects.

Still another object is to provide a novel system for producing a radial sweep of the electron beam of an oscillograph which rotates in synchronism with rotation of the directional antenna associated with radio echo systems or similar apparatuses.

Still another object is to provide novel electrostatic means for producing a radial sweep of the electron beam of an oscillograph with novel means for rotating the sweep about a fixed point throughout any desired angle.

Still another object is to provide novel means utilized in connection with radio echo apparatuses for producing a radial sweep of the electron beam of an oscillograph and for rotating the sweep in synchronism with the antenna of the apparatus whereby indications of range and azimuth of remote objects included within a field extending 360° about the apparatus are readily obtained.

Still another object is to provide a novel sweep circuit employed in connection with radio echo apparatuses for producing a radial sweep of the electron beam of an oscillograph which rotates about a fixed point in synchronism with rotation of the antenna of the apparatus whereby direction of remote objects is represented by the angular displacement of the sweep with respect to a reference point and whereby range of such objects is represented by a measurement on the sweep.

Other objects and features of the invention will appear more fully from the following detailed description when considered in connection with the accompanying drawings which disclose one embodiment of the invention. It is to be expressly understood, however, that the drawings are designed for purposes of illustration only and not as a definition of the limits of the invention, reference for the latter purpose being had to the appended claims.

In the drawings, wherein similar reference characters denote similar parts throughout the several views.

Figure 3:
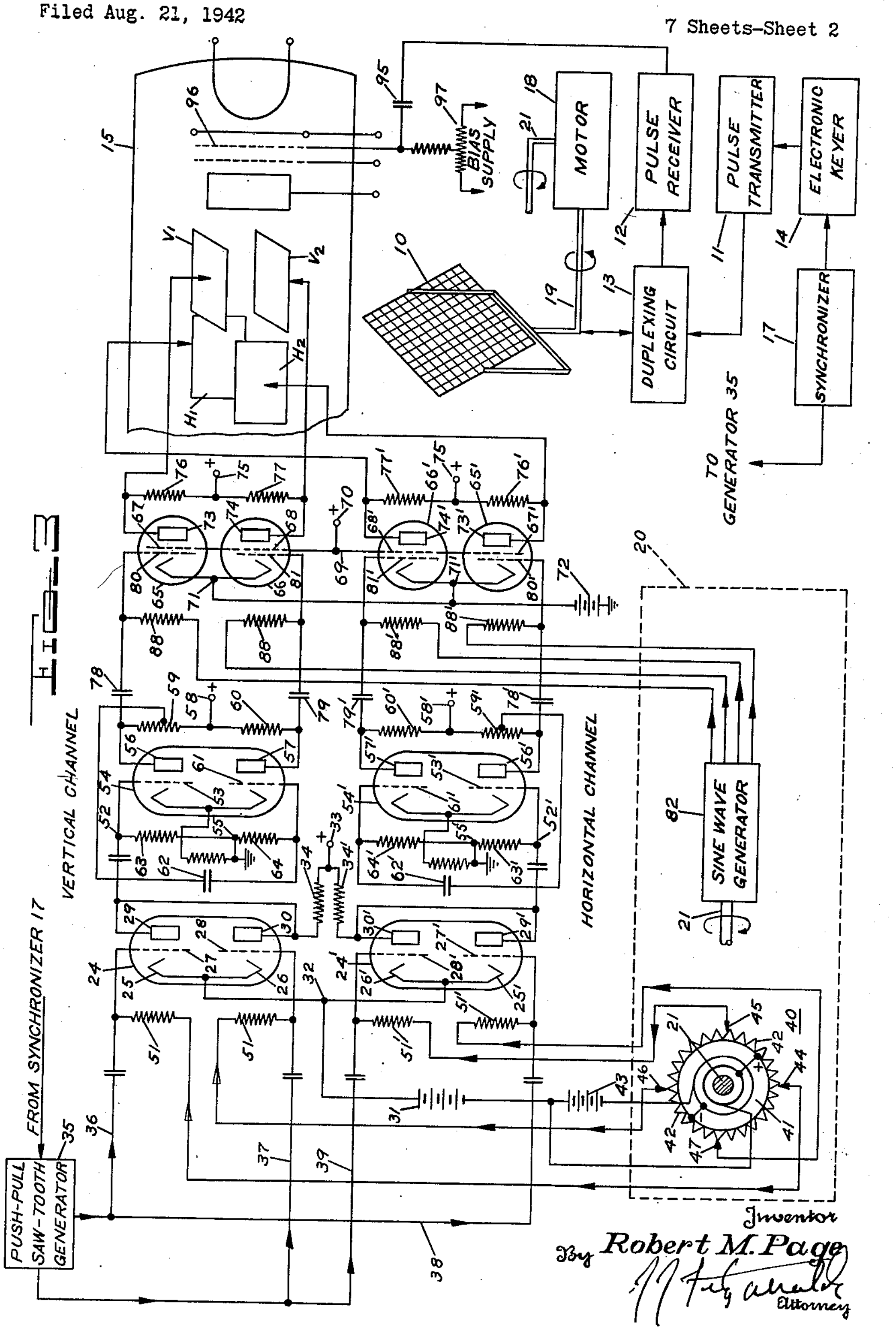
Fig. 3 is a diagrammatic illustration of the radio echo apparatus disclosed in Fig. 1, with certain portions thereof shown in greater detail.
Figures 4, 5, 6, 7, 8, 9:
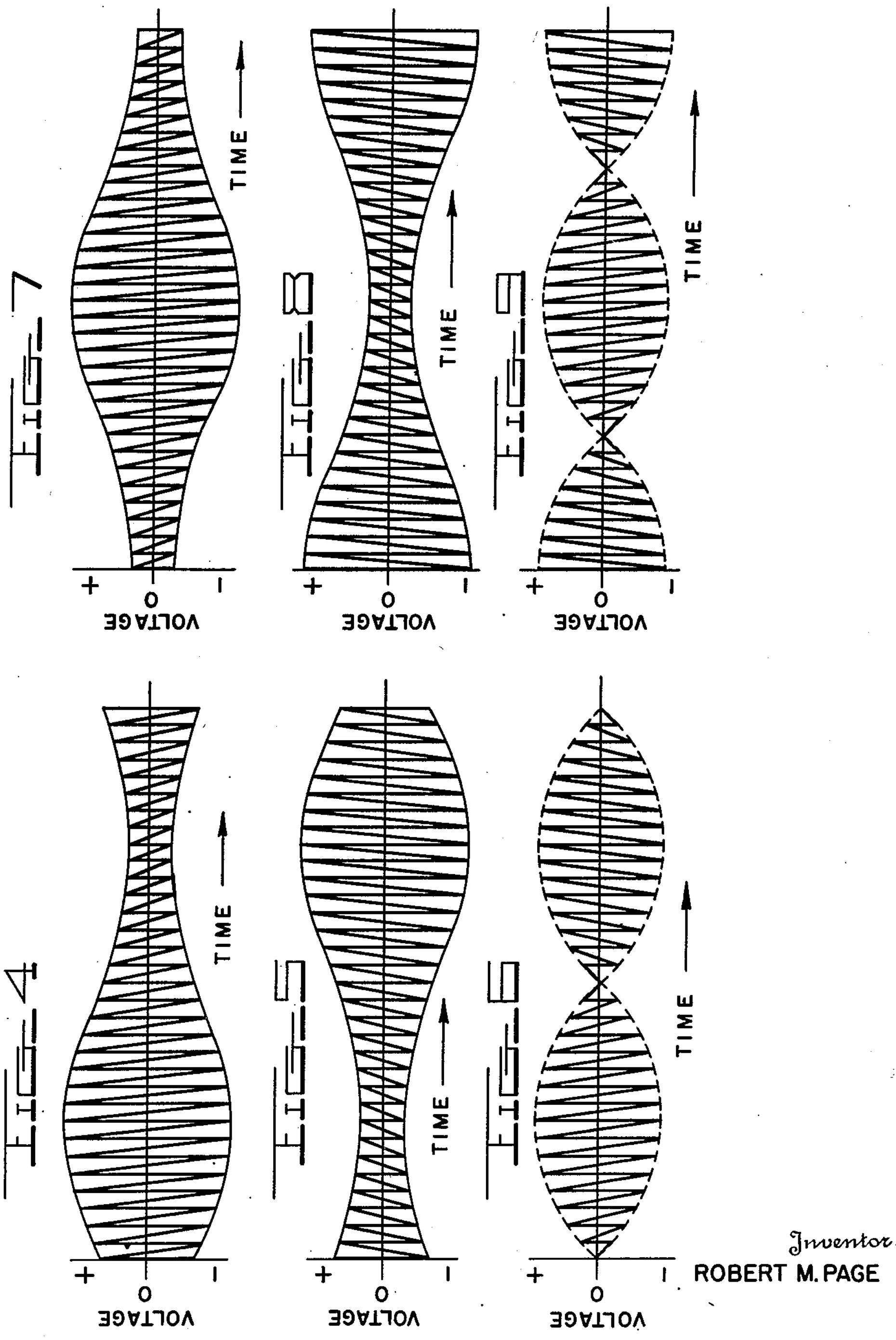
Figure 12:
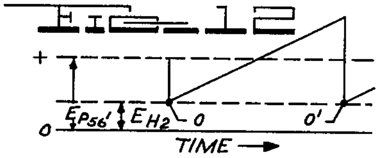
Figure 13:
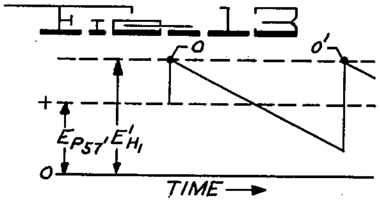
Figure 14:
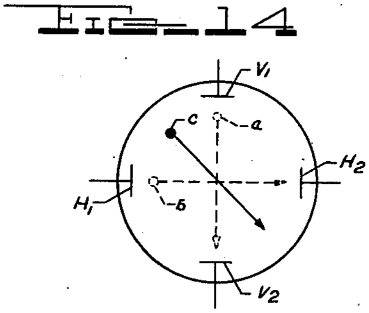
Figure 15:
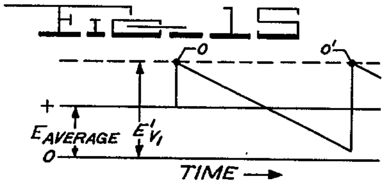
Figure 16:
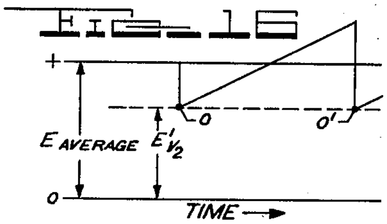
Figure 17:
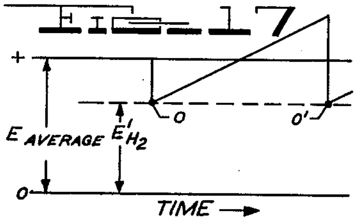
Figure 18:
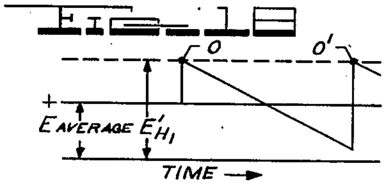
Figure 19:
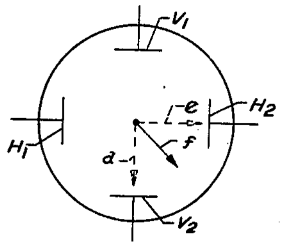
Figure 24:
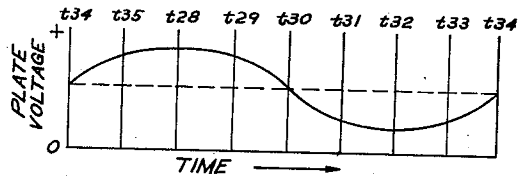
Figure 20:
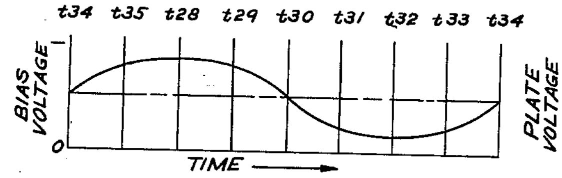
Figure 25:
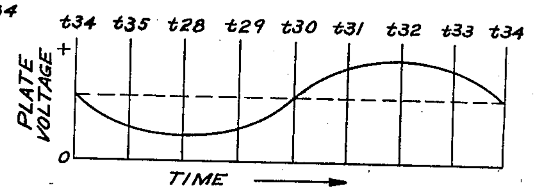
Figure 21:
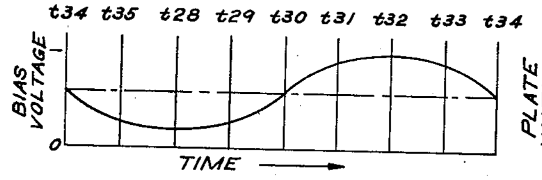
Figure 26:
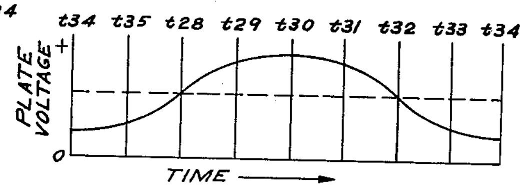
Figure 22:
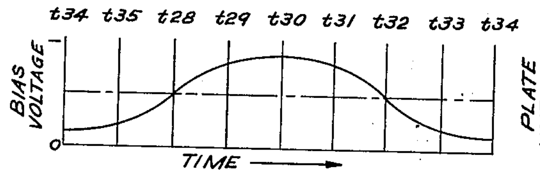
Figure 27:
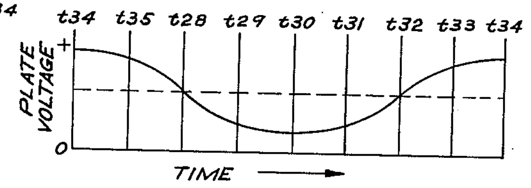
Figure 23:
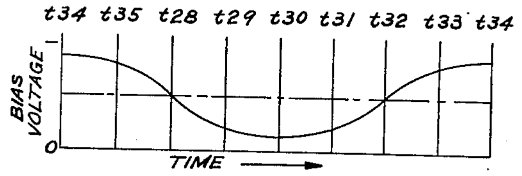

Fig. 4 discloses the voltage applied to point 52 from anode 29 upon a complete revolution of antenna 10, shown in Fig. 3;

Fig. 5 shows the voltage applied to point 52 from anode 30 upon a complete revolution of antenna 10;

Fig. 6 discloses the resultant voltage at point 52 upon simultaneous application of the voltages shown in Figs. 4 and 5;

Fig. 7 discloses the voltages applied to point 52′ from anode 29′ upon a complete revolution of antenna 10;

Fig. 8 shows the voltages applied to point 52′ from anode 30′ upon a complete revolution of antenna;

Fig. 9 discloses the resultant voltages applied to point 52′ upon simultaneous application of the voltages shown in Figs. 7 and 8;

Figs. 10 through 13 disclose the saw-tooth voltage outputs at anodes 56, 57, 56′ and 57′, for a certain angular position of antenna 10;

Fig. 14 shows the sweep produced on the oscillograph when the voltages disclosed in Figs. 10 through 13 are simultaneously impressed on the deflection plates thereof;

Figs. 15 through 18 show the saw-tooth voltages respectively disclosed in Figs. 10 through 13 swinging symmetrically across unequal positive potentials;

Fig. 19 shows the sweep produced on the oscillograph when the saw-tooth voltages disclosed in Figs. 15 through 18 are simultaneously applied to the deflection plates thereof;

Figs. 20 through 23 respectively disclose the varying direct current biases applied to grids 80, 81, 80′ and 81′ upon each complete revolution of antenna 10;

Figs. 24 through 27 respectively disclose the sinusoidal varying average potentials at anodes 73, 74, 73′ and 74′ upon each complete revolution of antenna 10, and Figs. 28 through 35 show various positions of antenna 10, the amplitude and phase relation of the saw-tooth voltages applied to the deflection plates for such positions of the antenna, and resultant sweeps produced on the oscillograph, throughout a complete revolution of antenna 10.

Figure 1:
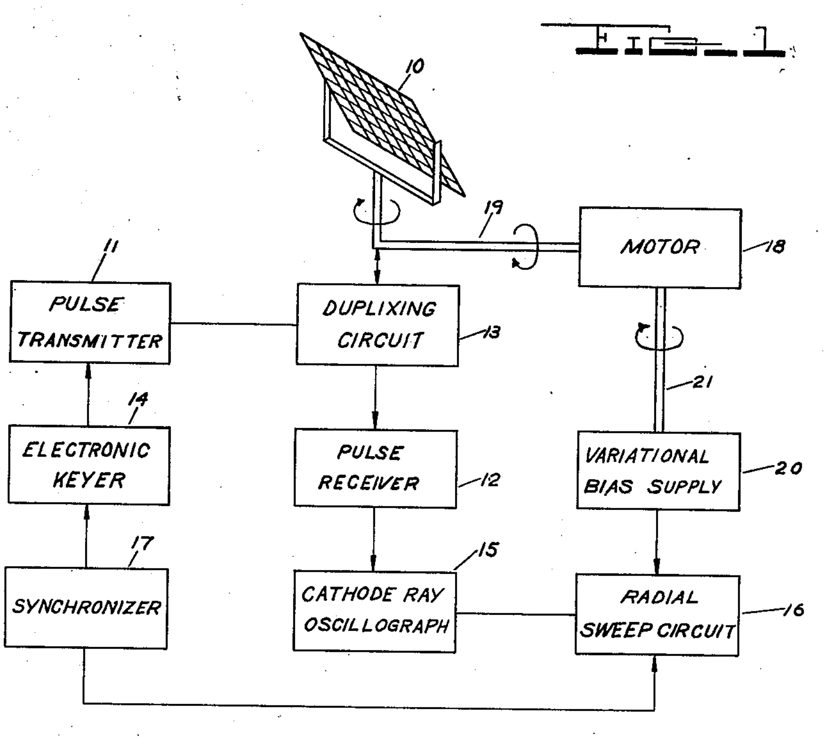
Fig. 1 is a diagrammatic showing, in block form, of a radio echo apparatus embodying the principles of the present invention.

With reference more particularly to Fig. 1 of the drawings, a radio echo apparatus embodying the principles of the present invention is disclosed therein including a rotatable directional beam antenna 10 constructed in any suitable manner for producing a highly directive beam of energy, a radio frequency pulse transmitter 11 and a radio frequency pulse receiver 12. Transmitter 11 and receiver 12 have connections with antenna 10 through duplexing circuit 13. Duplexing circuit 13 automatically functions to form an individual connection between transmitter 11 and antenna 10, and an individual connection between the antenna and receiver 12, for enabling a single antenna to be utilized for transmission as well as reception. A duplexing circuit constructed in accordance with the principles disclosed in the application of Leo C. Young and Robert M. Page for Impedance Control Coupling and Decoupling System, Ser. No. 326,640, filed March 29, 1940, adequately serves this purpose. Transmitter 11 is designed in such a manner as to respond to operation of electronic keyer 14 to emit radio frequency pulses at a predetermined rate, while receiver 12 is of such construction as to receive and properly amplify echo pulses that are produced when the transmitted radio pulses impinge upon and reflect from remote objects. Transmitters and receivers of the type employed in conventional television systems are suitable for these purposes. The radio echo apparatus further includes a suitable indicator 15, which may take the form of a cathode ray oscillograph, upon which indications of reception of echo pulses at receiver 12 are produced. In order to produce echo pulse indications on oscillograph 15 as a function of range of remote objects, sweep circuit 16 is provided for sweeping the electron beam of the oscillograph 15, while synchronizer 17, which is connected to electronic keyer 14 and sweep circuit 16, is included for properly synchronizing the radio pulse output of transmitter 11 and the sweep of the electron beam of the oscillograph. The apparatus is adjusted in such a manner that the electron beam of oscillograph 15 initiates movement in a certain direction at the instant a radio pulse is emitted from the transmitter. Sweep circuit 16 functions to sweep the electron beam of the oscillograph at a constant rate for a certain period of time following initial movement and for rapidly returning the electron beam to the original or normal position thereof prior to emission of the next radio pulse from the transmitter. When the pulse from transmitter 11 is emitted from antenna 10 in a direction to impinge upon a remote object an echo pulse is reflected from such object, received at antenna 10 and passed to receiver 12. The echo pulse is suitably amplified at the receiver and then applied to oscillograph 15 in such a manner as to modulate the intensity of the electron beam to produce an indication of the application thereof. The indication of the echo pulse on the oscillograph appears on the sweep a certain distance from the originating point thereof, such distance being directly proportional to the range of the remote object with respect to antenna 10.

As mentioned heretofore, one of the objects of the present invention is to provide a radio echo apparatus for detaching the presence of all remote objects included within a field extending 360° about the apparatus and for producing a visual plan position indication of such detected objects, with the indications of each object so characterized as to simultaneously show range and direction thereof. It is contemplated by the present invention to continually scan an area extending 360° about the apparatus with a highly directive source of energy, such as radio pulses, for impinging the energy upon all objects included within such area, and for continually radially sweeping the electron beam of oscillograph 15 in a direction corresponding to the direction of the energy. Since the electron beam of the oscillograph continually radially sweeps in a direction that corresponds to the direction of the transmitted beam of energy, the echo pulse indications are produced on the oscillograph in the same angular relation with respect to the center of the oscillograph as the angular orientation of the remote objects about the antenna. As shown in the drawing, motor 18 is provided for continually rotating antenna 10, by means of shaft 19, to continually scan an area extending 360° about the antenna with the highly directive beam of energy emitted from the antenna. In order to radially sweep the electron beam of oscillograph 15, in a direction corresponding to the direction of energy beam from antenna 10, sweep circuit 16 is constructed in such a manner as to continually radially sweep the electron beam of the oscillograph, while variational bias supply 20, which operates in synchronism with rotation of antenna 10 through shaft 21 from motor 18, supplies a varying bias to the sweep circuit in such a manner that the electron beam of the oscillograph at all times radially sweeps in a direction that corresponds to the direction of the transmitted beam of energy. The construction and operation of rotating radial sweep circuit 16 and variational bias supply 20 are described more fully hereinafter.

As aforementioned, the electron beam of the oscillograph is radially moved, in a direction corresponding to the bearing of antenna 10, that is, in the direction that the normal axis of the antenna is pointing, whenever an energy pulse is emitted. The radial movement of the electron beam produces a trace on the oscillograph screen that originates at the center of the screen and moves toward the periphery thereof in a direction corresponding to the direction the normal axis of the antenna is pointing, and consequently, since the normal axis of the antenna passes through the portion of the directional energy beam having greatest power, the trace moves in a direction that corresponds to the direction that energy of greatest power is emitted. As will appear more fully hereinafter, the intensity of the electron beam is biased in such a manner that the trace produced on the oscillograph is normally invisible; however, when energy, such as an echo pulse, or a noise signal, is applied to the oscillograph the intensity of the electron beam is modulated in such a manner as to render the trace visible at the instant energy is applied. Whenever an energy pulse emitted from antenna 10 impinges upon a remote object, energy is reflected from the object as an echo pulse, passed to and amplified at receiver 12, and applied to oscillograph 15 to modulate the intensity of the electron beam in the aforesaid manner to render the radial trace visible to produce a distinguishable indication on the trace a certain distance from the center of the oscillograph screen that is a direct measurement of range of the remote object from which the echo pulse reflected, with respect to the antenna. Furthermore, since the electron beam continually radially sweeps in a direction corresponding to the bearing of antenna 10, the radial trace produced on the oscillograph screen occupies an angular position, when the echo pulse indication is produced thereon, that corresponds to the bearing of antenna 10 at the instant the energy pulse impinged upon the remote object. Range and direction, or the azimuth angle, of the remote object are therefore simultaneously shown on the oscillograph screen by use of polar coordinates. The radial distance of the echo pulse indication represents range of the remote object, while the angular position of the radial trace is the azimuth angle of the remote object with respect to the antenna. The foregoing is more readily seen in Fig. 2 wherein the screen of oscillograph 15 is disclosed, having radial trace 22 shown in broken lines with an echo pulse indication 23 thereon. The radial distance of indication 23 from the center of the screen is a direct measurement of range of the remote object represented by the indication, while the angular position of trace 22 shows the azimuth angle of such object.

Figure 2:
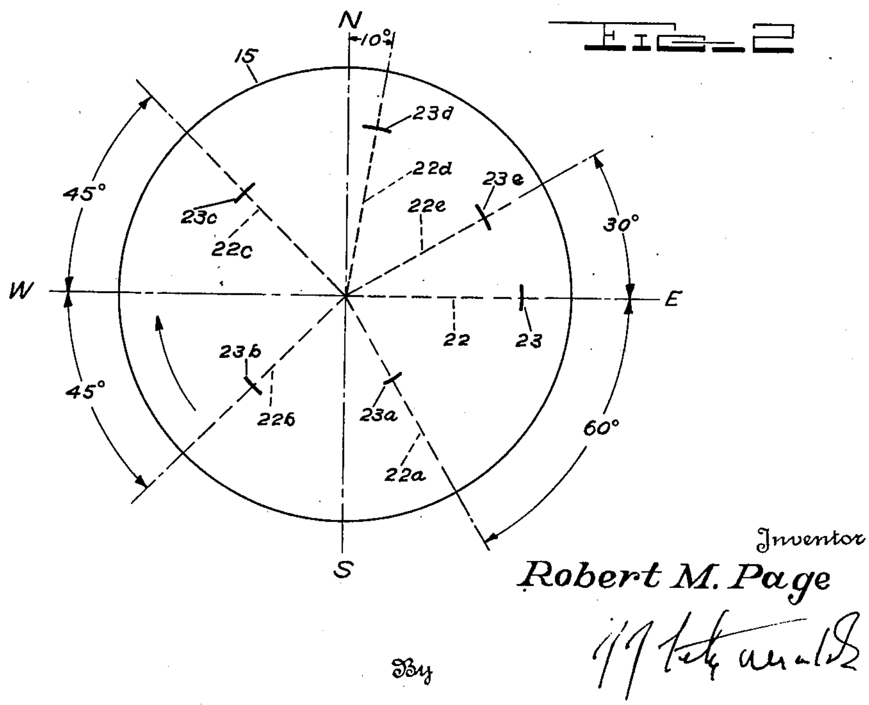
Fig. 2 is a schematic showing of the plan position indication produced by the apparatus disclosed in Fig. 1.

When antenna 10 is rotated throughout 360° a visual plan position indication is produced on the oscillograph screen which portrays all remote objects, included within the area scanned by the directional energy emitted from the antenna, on the oscillograph screen in such a manner as to indicate range and direction of every object with respect to the antenna, in the manner described above. Since the radial trace produced by the radial sweep of the electron beam continually rotates in synchronism with rotation of antenna 10, echo pulses reflected from remote objects included within an area extending 360° about the antenna are indicated on the screen of the oscillograph at certain radial and angular positions with respect to the center of the screen in a manner corresponding to the range and direction of the remote objects, with respect to the antenna, from which the echo pulses reflected. With reference again to Fig. 2, echo pulse indications *23a*, *23b*, *23c*, *23d* and *23e* are shown at various radial distances from the center of the oscillograph screen, while radial traces *22a*, *22b*, *22c*, *22d* and *22e*, upon which the echo pulse indications respectively appear, are shown at various angular positions about the center of the screen. It is to be expressly understood, therefore, that with a visual plan position indication having the foregoing characteristics, range and direction of all remote objects included within the area scanned by the directional energy from the antenna are simultaneously shown on the oscillograph screen by a single indication of each remote object. The range of the remote objects is given by a direct measurement of the radial distance from the echo pulse indication to the center of the oscillograph screen while the direction of the objects correspond to the angular position of the radial trace at the instant the indication is produced thereon. In order to facilitate determination of direction of remote objects from an indication of the foregoing type an azimuth scale may be positioned about the periphery of the screen, while north-south and east-west coordinates may be provided over the screen as shown in Fig. 2. Also, a series of, concentric circles may be utilized to aid determination of range of remote objects.

The radio echo apparatus shown in Fig. 1 is also disclosed in Fig. 3 of the drawings, with cathode ray oscillograph 15, radial sweep circuit 16, and variational bias supply 20, shown in greater detail. Oscillograph 16 is of conventional design including a pair of horizontal and vertical deflection plates and means for generating a beam of electrons, while sweep circuit 16 is constructed in such a manner as to simultaneously apply push-pull saw-tooth wave forms to each pair of deflection plates and is so characterized as to respond to the output of variational bias supply 20 to vary the phase and amplitude of the saw-tooth wave forms in such a manner as to apply the proper voltages to the deflection plates whereby the electron beam is continually radially moved, upon simultaneous application of saw-tooth wave forms, in a direction corresponding to the bearing of antenna 10. More particularly, the sweep circuit includes a pair of channels, one of which supplies the horizontal deflection plates $H_1$ and $H_2$ of the oscillograph, while the other channel provides the proper voltage to the vertical deflection plates $V_1$ and $V_2$. Hereinafter, each of the channels is respectively referred to as "horizontal" and "vertical" channels, as shown in the drawing. Also, similar elements of each of the channels have similar reference characters, with primed numerals designating elements of the horizontal channel. The first stage of the vertical and horizontal channels comprises vacuum tubes 24 and 24′ each of which respectively include a pair of cathodes 25, 26 and 25′, 26′, a pair of control grids 27, 28 and 27′, 28′, and a pair of anodes 29, 30 and 29′, 30′. Cathodes 25, 26, 25′ and 26′ are connected together at point 32 which is maintained at positive potential from source 31, while anodes 29, 30, 29′ and 30′ are supplied with a source of high positive potential from point 33 through resistances 34 and 34′. The control grids of tubes 24, 24′ are connected to wave generator 35. Generator 35 is constructed in such a manner as to produce a push-pull saw-tooth output that is fed to the control grids of tubes 24 and 24′ in such a manner that saw-tooth wave forms, 180° out of phase with respect to each other, are simultaneously applied to the grids of the tubes. More particularly, grids 27 and 28 are respectively connected to generator 35 by way of leads 36 and 37, while grids 27′, 28′ are connected to the output of the generator by way of electrical conductors 38 and 39, respectively.

In addition to the saw-tooth push-pull input to the grids of tubes 24 and 24′, a suitable varying direct current voltage is also applied thereto for modulating the amplitudes of the saw-tooth wave forms in accordance with rotation of antenna 10. Such varying direct current voltages are derived from sine wave generator 40 which comprises a portion of variational bias supply 20. Generator 40 includes cylindrical member 41 which rotates in synchronism with rotation of antenna 10 by means of a connection from motor 18 through shaft 21. A circular resistance member 42 is secured to the outer periphery of member 41 and is continually supplied with direct current from source 43 through suitable slip rings each of which had a connection to circular resistance member 42 at diametrically opposite points. Generator 40 further includes stationary contact members 44, 45, 46 and 47 disposed about the periphery of the circular resistance member 42 in quadrature with respect to each other and in such a manner that each of the contact members continually electrically engages circular resistance member 42. Contact members 44 and 46 are respectively connected to control grids 27 and 28 of tube 24, through resistances 51, 51, while contact members 45 and 47 are respectively connected to grids 28′ and 27′ of tube 24′ through resistances 51′, 51′. The value of circular resistance member 42 sinusoidally varies in such a manner that direct current voltage having a sinusoidal varying amplitude is generated at stationary contact members 44, 45, 46 and 47, with the sinusoidal varying amplitude following a complete sinusoidal cycle upon each complete revolution of cylindrical member 41. Since contact members 44, 46, are disposed 180° with respect to each other the potential output at these contact members, and consequently the sinusoidally varying direct current voltage applied to grids 27 and 28, are 180° out of phase with respect to each other. Also, since stationary contact members 45 and 47 are likewise disposed 180° with respect to each other about the circular resistance member, the sinusoidal varying direct current voltages applied to grids 27′ and 28′ are likewise 180° out of phase. Moreover, the sinusoidal varying direct current voltages applied to the grids of tube 24′ vary in quadrature with respect to the sinusoidal varying direct current voltages applied to the grids of tube 24 since contact members 45 and 47 are positioned about circular resistance member 42 at right angles to contact members 44 and 46. For a purpose that will appear more fully hereinafter, generator 40 is designed in such a manner to produce a constant direct current output at contacts 44, 45, 46 and 47 when member 41 is stationary, with the output at each contact having a value determined by the angular position of member 41.

Anodes 29 and 30 of tube 24 are connected together and the outputs of the tube are passed through a common condenser to point 52, while the outputs at anodes 29′ and 30′ are likewise applied through a common condenser, to point 52′. The sinusoidal varying biases applied to grids 27, 28, 27′ and 28′ sinusoidally modulate the amplitudes of the saw-tooth wave forms applied to the grids from generator 35. The voltages from anode 29 applied to point 52 during a complete revolution of antenna 10 are shown in Fig. 4, while Fig. 5 discloses the voltages applied to point 52 from anode 30 during the time the voltages shown in Fig. 4 are generated. From Figs. 4 and 5, it is seen that saw-tooth wave forms, swinging symmetrically across a line of zero potential, are applied from the anodes to point 52, 180° out of phase, with the amplitudes of the saw-tooth wave forms from anode 29 sinusoidally modulated 180° out of phase with respect to the sinusoidally modulated amplitudes of the saw-tooth wave forms from anode 29. It is also seen from the latter figures that the sinusoidally modulated amplitudes vary through a complete sinusoidal cycle upon each complete revolution of antenna 10. The voltages shown in Figs. 4 and 5 comprise the components of the resultant voltage output of tube 24 that appears at point 52. As shown in Fig. 6, such resultant voltage comprises saw-tooth wave forms swinging symmetrically across the line of zero potential, having 100% sinusoidally modulated amplitudes with the sinusoidally varying amplitudes developing a complete sinusoidal cycle upon each complete revolution of the antenna. During development of the first half sinusoidal cycle the saw-tooth wave forms are in phase with the saw-tooth wave forms applied to point 52 from anode 29, while during development of the second half sinusoidal cycle the saw-tooth wave forms are 180° out of phase with respect to the phase thereof during the first half cycle, which is the phase of the saw-tooth wave forms applied from anode 30. The voltages applied to point 52′ from anodes 29′ and 30′ are respectively shown in Figs. 7 and 8, while the resultant voltage output of tube 24′ appearing at point 52′ is shown in Fig. 9. The voltages shown in Figs. 7, 8 and 9 are generated during a complete revolution of antenna 10 in the same time relation as the voltages disclosed in Figs. 4, 5 and 6. As shown, the voltages from anodes 29′ and 30′ comprise saw-tooth wave forms swinging symmetrically across the zero potential line, 180° out of phase with respect to each other, having sinusoidally modulated amplitudes 180° out of phase through a complete sinusoidal cycle upon each complete revolution of antenna 10. Since the sinusoidal varying biases applied to grids 27′ and 28′ are in quadrature with respect to the sinusoidal biases applied to grids 27 and 28, the sinusoidal varying amplitudes of the saw-tooth wave forms shown in Figs. 7 and 8 are 90° out of phase with respect to the phase of the sinusoidal modulated amplitudes of the saw-tooth wave forms shown in Figs. 4 and 5. With reference to Fig. 9, the resultant voltages appearing at point 52′ from the addition of the voltages shown in Figs. 7 and 8, comprise saw-tooth wave forms swinging symmetrically across the zero potential line, the amplitudes of which are 100% sinusoidally modulated through a complete sinusoidal cycle upon a complete revolution of the antenna, while the saw-tooth wave forms are 180° out of phase during each half sinusoidal cycle, in a manner corresponding to the varying phases and amplitudes of the saw-tooth wave forms shown in Fig. 6. Since, as mentioned above, the amplitudes of the saw-tooth wave forms shown in Figs. 7 and 8 are sinusoidally modulated in quadrature with respect to the amplitudes of the voltages disclosed in Figs. 4 and 5, the resultant voltages appearing at point 52′ are 90° out of phase with respect to the phase of the voltage output of tube 24 appearing at point 52, as readily seen by simultaneous reference to Figs. 6 and 9.

Points 52 and 52′ are respectively connected to grids 53 and 53′ of duplex vacuum tubes 54 and 54′ each of which comprises the second stage of the vertical and horizontal channels, respectively. The cathodes of tubes 54 and 54′ are connected through resistances to ground, while anodes 56, 57 and 56′, 57′ are connected to points 58, 58′ of positive potential in push-pull relation by means of resistances 59, 60 and 59′, 60′. Tubes 54 and 54′ are biased for class A operation so that the potential at anodes 56 and 56′, and the potential across resistances 59 and 59′ comprises saw-tooth wave forms which swing symmetrically across the average positive potential applied to the anodes from points 58 and 58′, the amplitudes and phases of which vary in a manner corresponding to the varying phases and amplitudes of the resultant saw-tooth wave forms appearing at points 52 and 52′. The voltage outputs of anodes 56 and 56′ are fed by way of resistances 59, 59′ and condensers 62, 62′ to the other grids 61 and 61′ of tubes 54 and 54′, respectively. The connections from resistances 59 and 59′ are adjusted in such a manner so that the voltages applied to grids 61 and 61′ are equal to the voltages applied to grids 53 and 53′. With the foregoing arrangement, tubes 54 and 54′ produce push-pull saw-tooth outputs with the saw-tooth wave forms swinging symmetrically across the average anode potentials, and having sinusoidally varying amplitudes 180° out of phase at each tube, with the amplitudes developing a complete sinusoidal cycle upon each complete revolution of antenna 10, and with the saw-tooth wave forms produced during one-half the sinusoidal cycle being 180° out of phase with respect to the saw-tooth wave forms generated during the other half-cycle of the complete sinusoidal cycle. For reasons mentioned heretofore, the push-pull outputs of tubes 54 and 54′ sinusoidally vary in quadrature with respect to each other.

Figure 10:
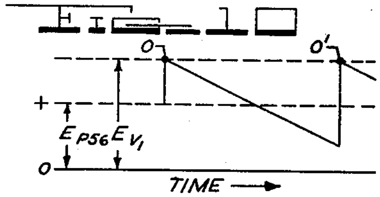
Figure 11:
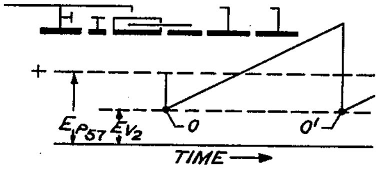

As will appear more fully hereinafter, application of the push-pull outputs of tubes 54 and 54′ to the vertical and horizontal deflection plates of oscillograph 15 would produce a sweep of the electron beam in a direction determined by the bearing of antenna 10, whenever saw-tooth wave forms are simultaneously applied to the deflection plates. However, application of the foregoing voltages to the deflection plate does not produce a radial sweep of the electron beam, that is, a sweep that originates at the center of the oscillograph screen and moves toward the periphery thereof. The foregoing is more readily understood with reference to Figs. 10 through 14 which disclose instantaneous saw-tooth wave forms respectively produced at anodes 56, 57, 56′ and 57′ for a certain position of antenna 10 wherein generator 40 applies direct current biases to the grids of tubes 24, 24′ so that saw-tooth wave forms having equal amplitudes 180° out of phase at anodes 56, 57 and at anodes 56′, 57′ are produced. The voltage output at anode 56 is shown in Fig. 10 wherein $E_{p_{56}}$ represents the average potential applied to the anode, and $E_{v_1}$ represents the voltage applied to vertical deflection plate $V_1$ at the instant $o$ the saw-tooth wave form originates, while in Fig. 11, the output of anode 57 is shown with $E_{p_{57}}$ and $E_{v_2}$ respectively representing the average potential applied to the latter anode and the voltage applied to the vertical deflection plate $V_2$ at the instant $o$ the saw-tooth wave form originates, if the outputs of tube 54 were directly connected to the vertical deflection plates. As shown in Fig. 14, when the voltages disclosed in Figs. 10 and 11 are applied to the vertical deflection plates $V_1$ and $V_2$ respectively, the electron beam occupies position $a$, at the instant $o$ the saw-tooth wave forms originate, since deflection plate $V_1$ has a higher positive potential impressed thereon than the potential applied to deflection plate $V_2$. As the saw-tooth wave forms sweep, the electron beam moves across the center of the oscillograph screen toward deflection plate $V_2$. In Figs. 12 and 13 the voltage outputs at anodes 56' and 57' are shown wherein $E_{P_{56'}}$ and $E_{P_{57'}}$ respectively represent the average potentials applied to the anodes, and $E_{H_2}$ and $E_{H_1}$ respectively represent the voltages applied to horizontal deflection plates $H_2$ and $H_1$, at the instant o the saw-tooth wave forms originate, in the event that the outputs of tube 54' were applied to the horizontal deflection plates. From the latter figure it is seen that unequal voltages $E_{H_1}$ and $E_{H_2}$ are applied to the horizontal deflection plates at instant o, and therefore, as shown in Fig. 14, the electron beam occupies position b, adjacent to deflection plate $H_1$, at the instant the saw-tooth wave forms originate, and the electron beam is moved across the oscillograph toward deflection plate $H_2$ as the saw-tooth wave forms sweep. When the voltages shown in Figs. 10 through 13 are simultaneously applied to the proper deflection plates a resultant voltage appears between the deflection plates that moves the electron beam to position c, at instant o, that is equally distant from positions a and b since the voltages applied to deflection plates $V_1$ and $H_1$ are of equal values. As the saw-tooth wave forms sweep, the electron beam moves diagonally across the oscillograph screen, through the center thereof, toward a point on the periphery of the screen diametrically opposite position c, and abruptly returns to position c when the saw-tooth wave forms terminate. Since the amplitude and phases of the saw-tooth wave forms shown in Figs 10 through 13 correspond to the angular position of antenna 10, the electron beam is moved in a direction determined by the direction that antenna 10 is pointing; however, a sweep of the electron beam having the foregoing characteristics cannot be employed for indicating range and direction of remote objects included within a field 360° about the antenna, since the sweep, as shown in Fig. 14, would rotate about the midpoint thereof in synchronism with rotation of the antenna. Therefore, the push-pull outputs of tubes 54 and 54' are inadequate to provide the sweep of the electron contemplated by the present invention.

In order to produce a radial sweep of the electron beam, it is necessary to apply the saw-tooth wave forms to the deflection plates of the oscillograph, of the proper amplitude and at the proper phases, in such a manner that the saw-tooth wave forms originate at points of equal potential. When saw-tooth wave forms having the originating points thereof at equal potentials are simultaneously supplied to the deflection plates, equal voltages are applied to the plates and consequently the electron beam is maintained at a position equally distant from the deflection plates, namely, at the center of the oscillograph screen at the instant the saw-tooth wave forms originate. The foregoing is accomplished, as shown in Figs. 15 through 18, by varying the average potentials across which the saw-tooth wave forms symmetrically swing. In these figures, the saw-tooth wave forms disclosed in Figs. 10 through 13 are shown symmetrically swinging across average potentials, having values different from the average anode potential values $E_{P_{56}}$, $E_{P_{57}}$, $E_{P_{56'}}$ and $E_{P_{57'}}$, so that the voltages applied to the deflection plates at instant o, namely voltages $E'_{V_1}$, $E'_{V_2}$, $E'_{H_1}$ and $E'_{H_2}$ are of equal values. Simultaneous application of the saw-tooth wave forms shown in Figs. 15 and 16 to the vertical deflection plates produce a radial sweep d of the electron beam as shown in Fig. 19. With further reference to the latter figure, application of the voltages disclosed in Figs. 17 and 18 to the horizontal deflection plates produces sweep e, while simultaneous application of the saw-tooth wave forms shown in Figs. 15 through 18 to the proper deflection plates produces radial sweep f which originates at the center of the oscillograph screen and moves toward the periphery thereof in a direction determined by the angular position of antenna 10.

As mentioned heretofore, in order to produce a sweep of the electron beam which rotates in synchronism with rotation of antenna 10, means are provided for continually varying the amplitude and phase of the saw-tooth wave forms applied to each deflection plate in accordance with rotation of the antenna, while maintaining definite phase relations between such voltages. Since it is necessary, as previously mentioned with reference to Figs. 10 through 19, to vary the average potentials across which the saw-tooth wave forms symmetrically swing in order to obtain a radial sweep of the electron beam upon simultaneous application of saw-tooth wave forms to the deflection plates and furthermore, since the potentials at the instant the saw-tooth wave forms originate continually vary as the amplitude and phase of the saw-tooth wave forms vary in accordance with the rotation of antenna 10, means are provided for continually varying the average potentials across which the saw-tooth wave forms symmetrically swing in accordance with rotation of antenna 10 in such a manner as to continually maintain the originating points of the saw-tooth wave forms at equal potentials.

The foregoing means comprises, with further reference to Fig. 3, individual modulator stages connected between anodes 56, 57 and 56', 57' and deflection plates $V_1$, $V_2$, $H_2$ and $H_1$ respectively. The aforementioned stages associated with the vertical deflection plates include screen grid vacuum tubes 65 and 66 connected in push-pull relation. Screen grids 67 and 68 of tubes 65 and 66, respectively, are connected together at point 69 and are maintained at positive potential by a suitable source applied at point 70, while the cathodes of the tubes are connected together at point 71 which is maintained at a suitable potential, by means of battery 72, for class A operation of the tubes. Anodes 73 and 74 are connected to point 75 of positive potential through resistances 76 and 77, while the anodes are also respectively connected to vertical deflection plates $V_1$ and $V_2$. Grids 80 and 81 of the tubes are respectively connected through condensers 78 and 79 to anodes 56 and 57 of tube 54 in order to vary the output of tubes 65 and 66 in accordance with the push-pull output of tube 54. The modulator stages between anodes 56' and 57' and horizontal deflection plates $H_2$ and $H_1$ are similar to the modulator stages described above and include screen grid vacuum tubes 65' and 66' with the elements thereof, and the circuit elements associated therewith, having primed numerals similar to the numerals designating corresponding elements and associated circuit elements of tubes 65 and 66. Since the modulator tubes are connected and biased for class A operation, the voltages appearing at the anodes thereof are therefore pulsating direct currents, pulsating as saw-tooth wave forms, wherein the amplitudes of the saw-tooth wave forms sinusoidally vary through a complete sinusoidal cycle upon each complete revolution of antenna 10, and wherein the saw-tooth wave forms are 180° out of phase during a half-cycle of the complete sinusoidal cycle with respect to the phase of the saw-tooth wave forms during the other half cycle. Also, for aforementioned reasons, the saw-tooth wave forms at anodes 73 and 74, and at anodes 73′ and 74′, are 180° out of phase with respect to each other, while the outputs of tubes 65′ and 66′ are in quadrature with respect to the outputs of tubes 65 and 66.

The means mentioned heretofore for maintaining the originating points of the saw-tooth wave forms at equal potential values also includes means for applying a direct crrent bias to grids 80, 81, 80′ and 81′ of the modulator tubes to vary the average anode potentials of the tubes in such a manner so that a radial sweep of the electron beam is produced upon simultaneous application of saw-tooth wave forms to the deflection plates. As shown in Fig. 3, the above means comprises sine wave generator 82 which is included in variational bias supply 20. Generator 82 is similar to sine wave generator 40, previously described, and operates in synchronism with rotation of antenna 10 through shaft 21. Generator 82 produces two pairs of sinusoidally varying direct current outputs, each varying through a complete sinusoidal cycle upon each complete revolution of antenna 10, with the outputs comprising each pair sinusoidally varying 180° out of phase, and with each of the pairs sinsoidally varying in quadrature wtih respect to the other pair. One pair of outputs from generator 82 is applied to grids 80 and 81, through resistances 88, 88; such voltages are respectively shown in Figs. 20 and 21. The other pair of outputs from the generator are fed to grids 80′ and 81′, through resistances 88′, 88′, and are respectively shown in Figs. 22 and 23. When the biases shown in Figs. 20 through 23 are applied to the grids of the modulator tubes, during a complete revolution of antenna 10, the plate current of the tubes is sinusoidally varied in accordance with such varying biases, and therefore, the average potentials appearing at anodes 73, 74, 73′ and 74′ sinusoidally vary 180° out of phase with respect to the phase of the sinusoidally varying direct current bias applied to corresponding grids. The sinusoidally varying anode potentials are shown in Figs. 24 through 27, with Figs 24 and 25 disclosing the potentials at anodes 73 and 74 respectively, while the potentials at anodes 73′ and 74′ are respectively shown in Figs. 26 and 27. Since tubes 65, 66, 65′ and 66′ are biased for class A operation, the saw-tooth wave forms appearing at the anodes swing symmetrically across the sinusoidal varying anode potentials shown in Figs. 24 through 27. By applying the sinusoidal varying direct current biases to grids 80, 81, 80′ and 81′ in the proper phase relation with respect to the phase and sinusoidal varying amplitudes of the saw-tooth wave forms also applied to the grids, and by properly adjusting the value of such biases, the originating points of the saw-tooth wave forms applied to the deflection plates are continually maintained at equal potential values and a radial sweep of the electron beam, which rotates about the center of the oscillograph screen in synchronism with rotation of antenna 10, is therefore produced. More particularly, when the phase of the saw-tooth wave forms is such that the waves linearly increase from a minimum positive potential value to a maximum positive potential value, the phase of the bias applied to the grid is such that the average anode potentials sinusoidally vary through the more positive 180° swing of the complete sinusoidal cycle, and when the saw-tooth wave forms are of such phase to linearly sweep from a miximum positive potential value to a minimum positive potential value, the plate current of the modulator tubes is varied in such a manner as to sinusoidally vary the anode potential through the less positive 180° swing of the complete sinusoidal cycle.

Figures 28, 29, 30, 31:
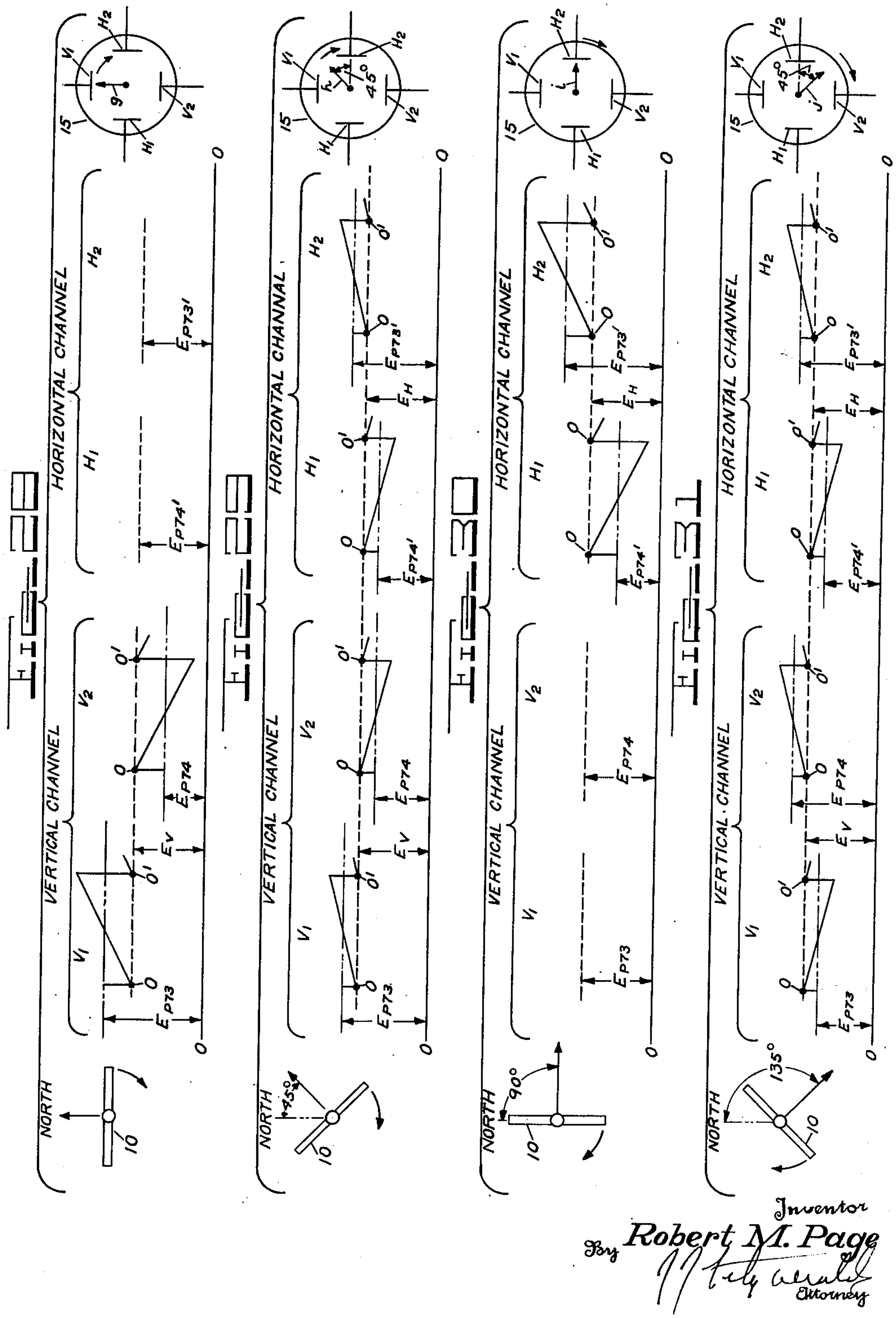

In order to more readily comprehend the manner that the saw-tooth wave forms applied to the deflection plates of oscillograph 15 are varied in amplitude and phase in accordance with rotation of antenna 10 for producing a radial sweep of the electron beam of the oscillograph which rotates in synchronism with rotation of the antenna, reference is had to Figs. 28 through 35 wherein the voltages applied to the deflection plates are shown for various positions of antenna 10 throughout a complete revolution thereof, as well as the resultant sweep produced on the oscillograph. In Fig. 28, antenna 10 is shown in a position wherein the directional energy emission therefrom is pointing due north, considering, for purposes of description, the top of the drawings as north. When antenna 10 occupies such position, sine wave generator 40 applies maximum bias to grid 27 of tube 24 and minimum bias to grid 28 of the latter tube, while applying equal biases to the grids of tube 24′. The saw-tooth wave forms applied to the vertical deflection plates are therefore of maximum amplitude and 180° out of phase, whereas no saw-tooth wave forms appear at the output of the horizontal channel since the outputs at anodes 29′ and 30′ are completely balanced out at point 52′. When antenna 10 is pointing due north, as shown in Fig. 28, which is considered time interval $t_{28}$, sine wave generator 82 applies a minimum bias to grid 80 of tube 65 and a maximum bias to grid 81 of tube 66, as shown by ordinates $t_{28}$ in Figs. 20 and 21 respectively. The decrease in positive bias to the grid of tube 65 increases the average potential at the anode thereof to a value shown by ordinate $t_{28}$ in Fig. 24, while the increased positive bias on grid 81 decreases the average potential at the anode of tube 66 to a value at ordinate $t_{28}$ of Fig. 25. The average potentials at anodes 73 and 74, namely $E_{p_{73}}$ and $E_{p_{74}}$ are thus varied in such a manner as to maintain the originating points o of the saw-tooth wave forms applied to the vertical deflection at equal potential value, Ev. Generator 82 also applies equal bias to grids 80′ and 81′, of tubes 65′ and 66′, as shown by ordinates $t_{28}$ of Figs. 22 and 23, to operate the tubes in such a manner to maintain anodes 73′ and 74′ at equal average potentials. When the voltages shown in Fig. 28 are applied to the proper deflection plates of oscillograph 15 the electron beam of the oscillograph radially sweeps toward due north which corresponds to the direction antenna 10 is pointing, as shown by radial sweep g.

In Fig. 29 antenna 10 is shown in a position after the latter has rotated 45° in a clockwise direction from the position thereof disclosed in Fig. 28. In this position of the antenna, generator 40 supplies the proper bias to the grids of tube 24 so that the amplitude of the saw-tooth wave forms applied to the vertical deflection plates are $$\frac{\sqrt{2}}{2}$$

the value of the amplitudes shown in Fig. 28, while also applying suitable unequal bias to the grids of tube 24' whereby saw-tooth wave forms, having amplitudes equal to the amplitude of the saw-tooth wave forms at the vertical channels, are applied to the horizontal deflection plates. During the period of rotation of antenna 10 between the positions thereof shown in Figs. 28 and 29, generator 82 applies varying bias to grids 80, 81, 80' and 81' in accordance with varying voltages between ordinates $t_{28}$ and $t_{29}$ of Figs. 20 through 23, to vary the average anode potential at tubes 65, 66, 65' and 66' in a manner shown in Figs. 24 through 27 to maintain the originating points of the saw-tooth wave forms at equal potential. During the time the antenna rotates from the position thereof shown in Fig. 28 to the position shown in Fig. 29, the saw-tooth wave forms applied to the deflection plates are maintained in the proper phase relationship as shown in Fig. 29, while the amplitudes of the saw-tooth wave forms continually vary in such a manner that the electron beam is radially swept in a direction corresponding to the position of the antenna. When antenna 10 occupies the position shown in Fig. 29, the electron beam is moved in a corresponding direction, shown by sweep *h*.

Figures 32, 33, 34, 35:
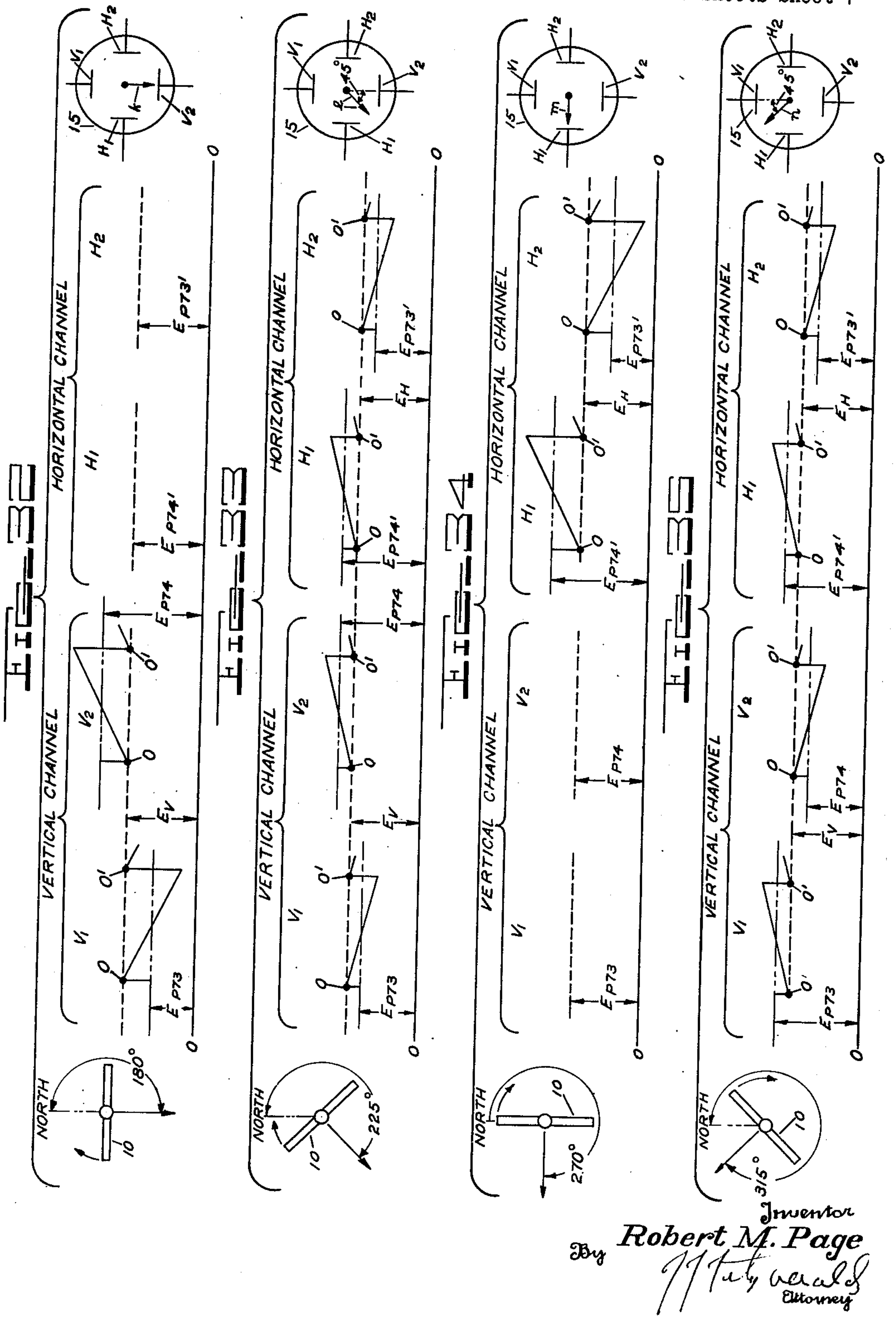

As the antenna continues to rotate in a clockwise direction the sweep on the oscillograph will rotate therewith, and when the latter has rotated 90° from a position referred to in Fig. 28 the voltages shown in Fig. 30 are produced wherein the output of the vertical channel comprises a constant voltage value $E_{p73}$ and $E_{p74}$ while saw-tooth wave forms at maximum amplitude, in opposite phase relation, are impressed on the horizontal deflection plates. Such voltages applied to the oscillograph produce a radial sweep *i* of the electron beam which is disposed 90° from the sweep *g* shown in Fig. 28. In Fig. 31 the voltages impressed on the deflection plates of the oscillograph are shown corresponding to a position of the antenna after the latter is rotated 135° in a clockwise direction from the position thereof referred to in Fig. 28. In the latter figure it can be readily seen that the amplitude of, and the phase relation between the saw-tooth waves impressed on the oscillograph are such to produce a radial sweep *j* of the electron beam in a direction corresponding to the direction of the antenna, and that suitable bias is supplied to tubes 65, 66, 65' and 66' to maintain the voltages applied to the deflection plates equal at the originating points *o* thereof, thus maintaining the point about which the radial sweep rotates in the same position on the oscillograph screen. In Fig. 32 antenna 10 is shown in a position after the latter has rotated 45° in a clockwise direction from the position thereof referred to in Fig. 31, with sweep *k* on oscillograph 15. As the antenna rotated from the position referred to in Fig. 31, to this position, the amplitude of the saw-tooth output of the horizontal channel gradually decreased until equal constant potential is applied to the horizontal deflection plates. At the same time, the amplitude of the saw-tooth output at the vertical channel gradually increases, in the same phase relation as shown in Fig. 31, until maximum amplitude is reached. During this time generator 82 operates to maintain the originating point *o* of the saw-tooth wave forms at equal potentials. In Figs. 33 thru 35 various positions of the antenna are shown as the latter continues to rotate in a clockwise direction to follow one complete revolution. In these figures also, the various voltages applied to the deflection plates of the oscillograph are shown, as well as the resulting sweeps, *l*, *m* and *n*, on the oscillograph screen. It is to be expressly understood, therefore, that for each revolution of antenna 10 the radial sweep is rotated in synchronism with the antenna, about a fixed point on the oscillograph screen.

From Figs. 28 through 35 the varying amplitude of the saw-tooth waves forms impressed on the deflection plates of oscillograph 15 for each complete revolution of the antenna, and the phase relation therebetween are more readily understood. Also, the sinusoidally varying potentials of anodes 73, 74, 73' and 74' and their relation with the saw-tooth wave forms are clearly shown. Considering more particularly the voltages applied to vertical deflection plate $V_1$, throughout a complete revolution of the antenna, Fig. 28, discloses a saw-tooth wave form which originates at point *o* at a positive potential value $E_v$. As the wave sweeps, the positive potential thereof gradually increases to a point of maximum positive potential, from hence the wave abruptly decreases in amplitude and terminates at point *o'* which is at a positive potential $E_v$. As the antenna rotates in a clockwise direction the amplitude of the saw-tooth wave gradually decreases until an extinction point is reached, as shown in Fig. 30, and upon continued rotation of the antenna, the amplitude of the saw-tooth wave form gradually increases from a point of extinction in opposite phase relation as shown in Fig. 31. When the phase of the saw-tooth wave shifts 180°, the same sweeps from point *o* with a gradually decreasing potential. The amplitude of the saw-tooth wave gradually increases, in this phase, as the antenna continues to rotate, until the point of minimum positive potential is reached, Fig. 32, from which point the amplitude gradually decreases in the same phase relation until a point of extinction is again attained. Upon further rotation of the antenna, the phase of the saw-tooth wave forms again shifts and the amplitude thereof gradually increases from the point of extinction shown in Fig. 34, to a maximum positive potential value shown in Fig. 28. It is to be noted that the values $E_{p73}$ vary through a complete sinusoidal cycle for each revolution of the antenna in order to maintain the point of origin *o* of the saw-tooth waves at an equal potential, namely $E_v$. The voltages applied to the vertical deflection plate $V_2$ vary in the same manner as the voltages applied to deflection plate $V_1$ but are 180° out of phase with respect to the latter. It can be readily seen also, that the voltages applied to the horizontal deflection plates vary in the same manner as the voltages applied to the vertical deflection plates with the same phase relationship existing between horizontal deflection plates $H_1$ and $H_2$ as exist between vertical deflection plates $V_1$ and $V_2$; however, the voltages applied to horizontal deflection plates are in quadature with respect to similar voltages applied to vertical deflection plates.

With further reference to Fig. 3 of the drawings, the radio echo apparatus disclosed therein also includes transmitter 11 and receiver 12 both of which have connections with antenna 10 through duplexing circuit 13. The output of transmitter 11 is modulated in accordance with operation of electronic keyer 14 to produce a series of equally spaced radio frequency pulses at a rate controlled by synchronizer 17, the latter being connected to keyer 14. Synchronizer 17 is also connected to generator 35 so that saw-tooth wave forms and consequently, radial movement of the electron beam, are produced in synchronism with the radio frequency pulses. The output of receiver 12 is passed through coupling condenser 95 to grid 96 of the oscillograph to modulate the intensity of the electron beam whenever energy is passed through the receiver. Bias supply 97 is also connected to grid 96 to control the intensity of the electron beam. The bias supply is adjusted in such a manner so that the electron beam does not normally produce a visible trace on the oscillograph screen and therefore, only indications of noise signals and reflected energy applied to the grid are seen. This arrangement greatly facilitates observations, especially when the radial sweep is rotating at a high rate of speed. Operation of the radio echo apparatus disclosed in Fig. 3 is similar to the previously described operation of the apparatus disclosed in Fig. 1, and produces a plan position indication on the oscillograph screen of an area extending 360° about antenna 10 upon which indications of remote objects included in the area are produced in such a manner that range and direction of the objects are simultaneously obtained therefrom, as shown in Fig. 2.

The radio echo apparatus shown in Fig. 3 of the drawings is capable of operating in such a manner as to only produce indications on the oscillograph screen of remote objects included within an angular portion of the area extending 360° about the apparatus. As mentioned heretofore, sine wave generator 40 is designed in such a manner as to produce constant direct current outputs having amplitudes determined by the angular position of antenna 10, when the latter is stationary, and the generator is therefore capable of producing the necessary direct current bias to modulate the amplitude of the push-pull saw-tooth input to tubes 24 and 24' in the proper manner to radially sweep the electron beam of oscillograph 15 in a direction corresponding to the bearing of antenna 10 notwithstanding the speed or direction of rotation of the antenna. When it is desired to determine the range and direction of remote objects included within a limited area disposed at a certain angular position with respect to the apparatus, the antenna is continually rotated through an angle of sufficient degrees so that the directional energy therefrom scans the preselected area and impinges upon all remote objects included within such area. Since the electron beam of the oscillograph continually radially sweeps in a direction corresponding to the bearing of antenna 10, the radial trace produced on the oscillograph screen continually rotates through an angle corresponding to the angle through which the antenna swings. Indications of echo pulses reflected from remote objects included within the angularly scanned area are produced on the oscillograph screen in a manner fully described heretofore. Any desired angular area, at any angular position about the apparatus, may be scanned and indicated in the foregoing manner.

There is thus provided by the present invention novel methods of and means for indicating range and direction of remote objects, so characterized that range and directional indications of remote objects are simultaneously shown on an oscillograph, or similar indicator, from a single indication, and wherein the foregoing methods and means are capable to produce a plan position indication of an area extending 360° about a reference point and to produce indications of all remote objects in such a manner as to simultaneously show range and direction of the remote objects. Furthermore, the present invention provides novel methods of and means for producing a radial sweep of the electron beam of an oscillograph which is capable of rotating in synchronism with a remotely positioned rotatable member and it is so characterized that the same has numerous applications other than utilization in connection with radio echo apparatuses as disclosed herein.

Although only one embodiment of the invention has been disclosed and described, it is to be expressly understood that various changes and substitutions may be made therein without departing from the spirit of the invention as well understood by those skilled in the art. Reference therefore is to be had to the appended claims as a definition of the limits of the invention.

The invention described herein may be manufactured and used by or for the Government of the United States of America for governmental purposes without the payment of any royalties thereon or therefor.

What is claimed is:

1. An apparatus for indicating range and azimuth of remote objects comprising means producing a directional energy emission, means rotating said directional energy emission, a cathode ray tube indicator means, means producing a radial sweep of the electron beam of said cathode ray tube indicator synchronized with said energy emission, means rotating said sweep about the center of the face of said indicator tube in synchronism with rotation of said energy emission, biasing means holding the sweep initiation point at the center of the indicator tube, means producing indications on said sweep when said energy emission impinges upon and reflects from remote objects, whereby range of said remote objects is represented by a measurement on said sweep and whereby azimuth of said remote objects is represented from the angular displacement of said sweep when said indications are produced thereon.

2. In an apparatus for indicating range and azimuth of remote objects, means producing a directional pulse emission, means continually rotating said directional pulse emission through 360°, means producing a radial sweep of the electron beam of an oscillograph synchronized with said pulse emission, means rotating said sweep about one end thereof in synchronism with rotation of said directional pulse emission, biasing means holding said one end fixed in the center of the face of said oscillograph, means producing indications upon said sweep whenever said pulses impinge upon and are reflected from remote objects whereby range of said remote objects is represented by a distance on said sweep measured from said indications to said one end, and whereby azimuth of said remote objects is represented by the angular position of said sweep when said indications are produced thereon.

3. In a circuit for producing a rotating radial sweep of the electron beam of an oscillograph having a pair of vertical and a pair of horizontal deflection plates, means applying positive potentials to said plates, push-pull driver means impressing saw-tooth voltages on each plate of each of said pair of plates 180° out of phase with respect to the saw-tooth voltage applied to the other plate of the same pair of plates that swing symmetrically across said positive potential, means sinusoidally varying the amplitude of said saw-tooth voltages, said sinusoidal variation proceeding through one complete sinusoidal cycle for each complete revolution of said sweep, means sinusoidally varying the amplitude of the saw-tooth voltages applied to one of said pairs of plates in quadrature with respect to the sinusoidally varying amplitude applied to the other pair and biasing means sinusoidally varying the positive potential applied to each of said plates.

4. An apparatus for indicating movements of a remote rotatable member on an oscillograph having a pair of vertical and a pair of horizontal deflection plates comprising means applying positive potentials to said plates, push-pull driver means impressing saw-tooth voltages on each of said plates 180° out of phase with respect to the saw-tooth voltage applied to the other plate of the same pair of plates that swing symmetrically across the positive potential applied to the plates, means rotating in synchronism with said member for sinusoidally varying the amplitude of said saw-tooth voltages applied to each of said pair of plates, said sinusoidal variation proceeding through one complete sinusoidal cycle for each complete revolution of said member, means maintaining the sinusoidal variation applied to one of said pair of the plates in quadrature with respect to the other pair, and sinusoidal biasing means for said driver means for maintaining the points of origin of said saw-tooth voltages at equal potential whereby a radial sweep of the electron beam of said oscillograph is produced on the screen of said oscillograph which rotates in synchronism with rotation of said member.

5. In an apparatus for indicating range and azimuth of remote objects, means producing a directional radio pulse emission, means rotating said directional radio pulse emission, an oscillograph having a plurality of deflection plates, push-pull driver means applying saw-tooth voltages synchronized with said directional radio pulse emission to each plate of certain pairs of said plates 180° out of phase with respect to the other plate of the same pair of plates, means rotating in synchronism the rotation of said directional radio pulse emission for sinusoidally varying the amplitude of said saw-tooth voltages, said sinusoidal variations being in certain phase relations with respect to each other and proceeding through a complete cycle for each complete revolution of said directional radio pulse emission, means maintaining the sinusoidal variations of one pair of said plates in quadrature with respect to the sinusoidal variations of another pair of plates whereby a radial sweep of the electron beam of the oscillograph is produced on the screen of said oscillograph which rotates in synchronism with rotation of said directional radio pulse emission, and means producing indications on said sweep when said radio pulses impinge upon and are reflected from remote objects whereby range of said remote objects is represented on said sweep by the distance of said indications from one end thereof, and whereby azimuth of said remote objects is represented from the angular displacement of said sweep when said indications are produced thereon.

6. In an apparatus for indicating range and azimuth of remote objects, means producing a directional radio pulse emission, means rotating said directional radio pulse emission, an oscillograph having a plurality of deflection plates, push-pull driver means applying saw-tooth voltages synchronized with said directional radio pulse emission to each plate of certain pairs of said plates 180° out of phase with respect to the other plate of the same pair of plates, means rotating in synchronism with rotation of said directional radio pulse emission for producing a source of sinusoidal varying voltages, means applying said sinusoidal varying voltages to sinusoidally vary the amplitude of each of said saw-tooth voltages, said sinusoidal variations being in certain phase relations with respect to each other and proceeding through a complete cycle for each complete revolution of said directional radio pulse emission whereby a radial sweep of the electron beam of the oscillograph is produced on the screen of said oscillograph which rotates in synchronism with rotation of said directional radio pulse emission, means responsive to said sinusoidal varying voltages to continually rotate said sweep about a fixed point, and means producing indictions on said sweep when said radio pulses impinge upon and are reflected from remote objects whereby range of said remote objects is represented on said sweep by the distance of said indications from said point, and whereby azimuth of said remote objects is represented from the angle of displacement of such sweep when said indications are produced thereon.

7. In a circuit for producing a rotating radial sweep of the electron beam of a cathode ray tube indicator, the combination comprising, a first beam deflection channel coupled to said cathode ray tube indicator operative to produce a periodic deflection of the cathode ray beam in a first direction, a second beam deflection channel coupled to said cathode ray tube indicator operative to produce a similar periodic deflection of the cathode ray beam in a direction orthogonal to said first direction, sine wave generator means coupled to said beam deflection channels operative to sinusoidally amplitude modulate the first named deflection and to co-sinusoidally amplitude modulate the second named deflection, and beam centering biasing means coupled to said indicator tube and to said sine wave generator operative to sinusoidally vary the centering bias applied to said tube.

8. Apparatus for indicating the movement of a rotatable member on a cathode ray tube indicator, comprising, a first beam deflection channel coupled to said cathode ray tube indicator operative to produce a periodic deflection of the cathode ray beam in a first direction, a second beam deflection channel coupled to said cathode ray tube indicator operative to produce a similar periodic deflection of the cathode ray beam in a direction orthogonal to said first direction, a sine wave generator coupled to said rotatable member and synchronously driven thereby, means coupling the output of said generator to said beam deflecting channels operative to sinusoidally amplitude modulate the first named deflection and to co-sinusoidally amplitude modulate the second named deflection, and beam centering biasing means coupled to said indicator tube and to said sine wave generator operative to sinusoidally vary the centering bias applied to said tube.

9. In a radio echo detection system, a cathode ray tube indicator means, means producing a directional pulse energy emission rotatable in azimuth, receiver means coupled to said indicator for applying the received energy reflections from said directive energy emission to the beam of said cathode ray tube indicator, means for producing a rotating deflection field for the cathode ray tube indicator to radially deflect the beam thereof in synchronism with the pulse energy emission, means for causing the radial deflection to angularly move in correspondence with the motion of the directional energy emission, and electron beam biasing means for normally holding the start of said radial sweep in the center of the cathode ray tube indicator.

10. In a radio echo detection system, a cathode ray tube indicator means, means producing a directional pulse energy emission rotatable in azimuth, receiver means coupled to said indicator for applying the received energy reflections from said directive energy emission to the beam of said cathode ray tube indicator, means for producing a rotating deflection field for the cathode ray tube indicator to radially deflect the beam thereof in synchronism with the pulse energy emission, means for causing the radial deflection to angularly move in correspondence with the motion of the directional energy emission, and means for normally holding the start of said radial sweep in the center of the cathode ray tube indicator.

11. In a radio echo detection system, a pulse transmitter adapted to periodically release pulse energy emissions, a directional receiver for receiving said pulse energy emissions after reflection from remote objects, the direction of sensitivity of said receiver being rotatable in azimuth, a cathode ray tube indicator means coupled to the output of said receiver to indicate the receipt of energy reflections from remote objects, cathode ray beam deflection means coupled to said indicator to produce a radial sweep of the cathode ray tube beam in synchronism with the release of said pulse energy emissions, means for causing the radial deflection to angularly move in correspondence with the motion of the direction of sensitivity of said receiver, and means for normally holding the start of said radial sweep in the center of the cathode ray tube indicator.

References Cited in the file of this patent

UNITED STATES PATENTS

| Number | Name | Date |
|---|---|---|
| 2,105,902 | Cawein | Jan. 18, 1938 |
| 2,143,035 | Smith | Jan. 10, 1939 |
| 2,178,074 | Jakel et al. | Oct. 31, 1939 |
| 2,225,469 | Diebold | Dec. 17, 1940 |
| 2,231,929 | Lyman | Feb. 18, 1941 |
| 2,241,809 | De Forest | May 13, 1941 |
| 2,295,412 | Little | Sept. 8, 1942 |
| 2,313,966 | Poch | Mar. 16, 1944 |
| 2,409,448 | Rost | Oct. 15, 1946 |
| 2,412,669 | Bedford | Dec. 17, 1946 |
| 2,471,516 | Bryant | May 31, 1949 |
| 2,541,030 | Busignies | Feb. 13, 1951 |

FOREIGN PATENTS

| Number | Country | Date |
|---|---|---|
| 820,350 | France | July 26, 1937 |
| 108,556 | Australia | Sept. 14, 1939 |